United States Patent
Huici et al.

(10) Patent No.: US 11,733,989 B2
(45) Date of Patent: Aug. 22, 2023

(54) AUTOMATED AND DYNAMIC SYSTEM CALL SEALING

(71) Applicant: NEC Laboratories Europe GmbH, Heidelberg (DE)

(72) Inventors: Felipe Huici, Heidelberg (DE); Sharan Santhanam, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 17/330,442

(22) Filed: May 26, 2021

(65) Prior Publication Data
US 2022/0300266 A1    Sep. 22, 2022

Related U.S. Application Data

(60) Provisional application No. 63/163,967, filed on Mar. 22, 2021.

(51) Int. Cl.
G06F 8/61    (2018.01)
G06F 9/455    (2018.01)

(52) U.S. Cl.
CPC ............ G06F 8/63 (2013.01); G06F 9/45558 (2013.01)

(58) Field of Classification Search
CPC ................................ G06F 8/63; G06F 9/45558
See application file for complete search history.

(56) References Cited

U.S. PATENT DOCUMENTS

| | | |
|---|---|---|
| 9,219,752 B2 | 12/2015 | Balinsky et al. |
| 9,690,606 B1 | 6/2017 | Ha et al. |
| 9,727,318 B2 | 8/2017 | Naveh et al. |
| 9,886,303 B2 * | 2/2018 | Koller Jemio ............ G06F 8/54 |
| 10,169,028 B2 * | 1/2019 | Htay ......................... G06F 8/65 |

(Continued)

FOREIGN PATENT DOCUMENTS

| | | | |
|---|---|---|---|
| AU | 2015279922 B2 | 7/2018 | |
| CN | 107689953 A * | 2/2018 | ............ H04L 63/02 |

(Continued)

OTHER PUBLICATIONS

Kuo et al., "A Linux in Unikernel Clothing", Apr. 2020, ACM (Year: 2020).*

(Continued)

*Primary Examiner* — Wei Y Zhen
*Assistant Examiner* — Junchun Wu
(74) *Attorney, Agent, or Firm* — Leydig, Voit & Mayer, Ltd.

(57) ABSTRACT

Systems and methods for automatically generating a secure image with a reduced or minimal set of system calls (syscalls) required by an application to run. A method includes the steps of receiving as input a configuration file specifying one or more image parameters to vary; generating a set of one or more unikernel images, or experiment images, each unikernel image including a specification of how to build the image and how to run the image, each unikernel image based on one of the one or more image parameters; populating a run queue with the one or more unikernel images; and iteratively: executing each of the one or more unikernel images in a host virtual machine; and monitoring, at runtime, a usage of syscalls in the executing image to identify syscalls actually used at any point in time during the executing.

18 Claims, 2 Drawing Sheets

(56) References Cited

U.S. PATENT DOCUMENTS

| | | | | |
|---|---|---|---|---|
| 10,628,177 | B1* | 4/2020 | Eyberg | G06F 9/44521 |
| 10,945,166 | B2* | 3/2021 | Crawford | H04W 36/0083 |
| 11,321,107 | B1* | 5/2022 | Eyberg | G06F 9/45545 |
| 2009/0133001 | A1* | 5/2009 | Rozenfeld | G06F 8/20 717/127 |
| 2009/0199296 | A1* | 8/2009 | Xie | G06F 21/552 726/23 |
| 2018/0018456 | A1* | 1/2018 | Chen | G06F 21/552 |
| 2018/0165110 | A1* | 6/2018 | Htay | G06F 8/65 |
| 2018/0375897 | A1* | 12/2018 | Kawasaki | H04L 43/50 |
| 2019/0324732 | A1 | 10/2019 | Le et al. | |
| 2020/0241913 | A1* | 7/2020 | Do | G06F 9/45558 |
| 2020/0310950 | A1 | 10/2020 | Mueller | |
| 2020/0401700 | A1* | 12/2020 | Moran | G06F 8/65 |
| 2022/0300266 | A1* | 9/2022 | Huici | G06F 9/45558 |

FOREIGN PATENT DOCUMENTS

| | | | | |
|---|---|---|---|---|
| EP | 3882768 | A1* | 9/2021 | G06F 11/3644 |
| GB | 2537880 | A | 11/2016 | |

OTHER PUBLICATIONS

Talbot et al., "A Security Perspective on Unikernels", Jul. 2020, IEEE (Year: 2020).*

Madhavapeddy et al., "Unikernels: Library Operating Systems for the Cloud", Mar. 2013, ACM (Year: 2013).*

Williams et al., "Unikernels as Processes", Oct. 2018, ACM (Year: 2018).*

Wan, et al., "Mining Sandboxes for Linux Containers," *2017 IEEE International Conference on Software Testing, Verification and Validation (ICST)*, pp. 1-11, Mar. 13-17, 2017, Institute of Electrical and Electronics Engineers, Manhattan, New York, USA.

Olivier, et al., "A Binary-Compatible Unikernel," *International Conference on Virtual Execution Environments (VEE '19)*, pp. 59-73, Apr. 14, 2019, Association for Computing Machinery, Chicago, IL, USA.

Kuenzer, et al., "Unikraft: Fast, Specialized Unikernels the Easy Way," *EuroSys '21: Proceedings of the Sixteenth European Conference on Computer Systems*, pp. 1-20, Apr. 26, 2021, Cornell University Library, Ithaca, NY, USA.

Ghavamnia, Seyedhamed, et al., "Temporal System Call Specialization for Attack Surface Reduction," 29th USENIX Security Symposium (Aug. 12-14, 2020), USENIX Association, US, pp. 1749-1766.

Ghavamnia, Seyedhamed et al. "Confine: Automated System Call Policy Generation for Container Attack Surface Reduction," Jul. 18, 2020, $23^{rd}$ International Symposium on Research in Attacks, Intrusions, and Defenses, USENIX Association, US, pp. 443-458.

Demarinis, Nicholas et al. "Automated System Call Filtering for Commodity Software," Jul. 18, 2020, $23^{rd}$ International Symposium on Research in Attacks, Intrusions, and Defenses, USENIX Association, US, pp. 459-474.

Dymshits, Michael et al. "Process Monitoring on Sequences of System Call Count Vectors," arXiv:1707.03821v1, Jul. 12, 2017, IEEE, Arxiv, US, pp. 1-5.

Guerra-Manzanares, Alejandro et al. "Time-frame Analysis of System Calls Behavior in Machine Learning-Based Mobile Malware Detection," Oct. 2019, pp. 1-8, International Conference on Cyber Security for Emerging Technologies (CSET), Doha, Qatar.

Xu, Jing and Christian R. Shelton, "Intrusion Detection using Continuous Time Bayesian Networks," Journal of Artificial Intelligence Research 39, pp. 745-774, Dec. 2010, AI Access Foundation, US.

* cited by examiner

1

AUTOMATED AND DYNAMIC SYSTEM CALL SEALING

CROSS-REFERENCES TO RELATED APPLICATIONS

The present application claims priority to U.S. Provisional Patent Application No. 63/163,967, filed Mar. 22, 2021, entitled "AUTOMATED AND DYNAMIC SYSTEM CALL SEALING," which is hereby incorporated by reference in its entirety herein.

FIELD

The present embodiments relate to a method, system and computer-readable medium for sealing system calls (syscalls) to improve the security of applications and operating systems running on computers and user devices.

SUMMARY

The present embodiments provide systems and method for automatically generating a secure image with a reduced or minimal set of syscalls required by an application to run. According to an embodiment, a method for automatically generating a secure image with a reduced or minimal set of system calls (syscalls) required by an application to run includes steps of receiving as input a configuration file specifying one or more image parameters to vary; generating a set of one or more unikernel images, or experiment images, each unikernel image including a specification of how to build the image and how to run the image, each unikernel image based on one of the one or more image parameters; populating a run queue with the one or more unikernel images; and iteratively: executing each of the one or more unikernel images in a host virtual machine; and monitoring, at run-time, a usage of syscalls in the executing image to identify syscalls actually used at any point in time during the executing.

BRIEF DESCRIPTION OF THE DRAWINGS

Various embodiments will be described in even greater detail below based on the exemplary figures. The present invention is not limited to the exemplary embodiments. All features described and/or illustrated herein can be used alone or combined in different combinations in embodiments of the present invention. The features and advantages of various embodiments will become apparent by reading the following detailed description with reference to the attached drawings which illustrate the following.

DETAILED DESCRIPTION

Figure 1:
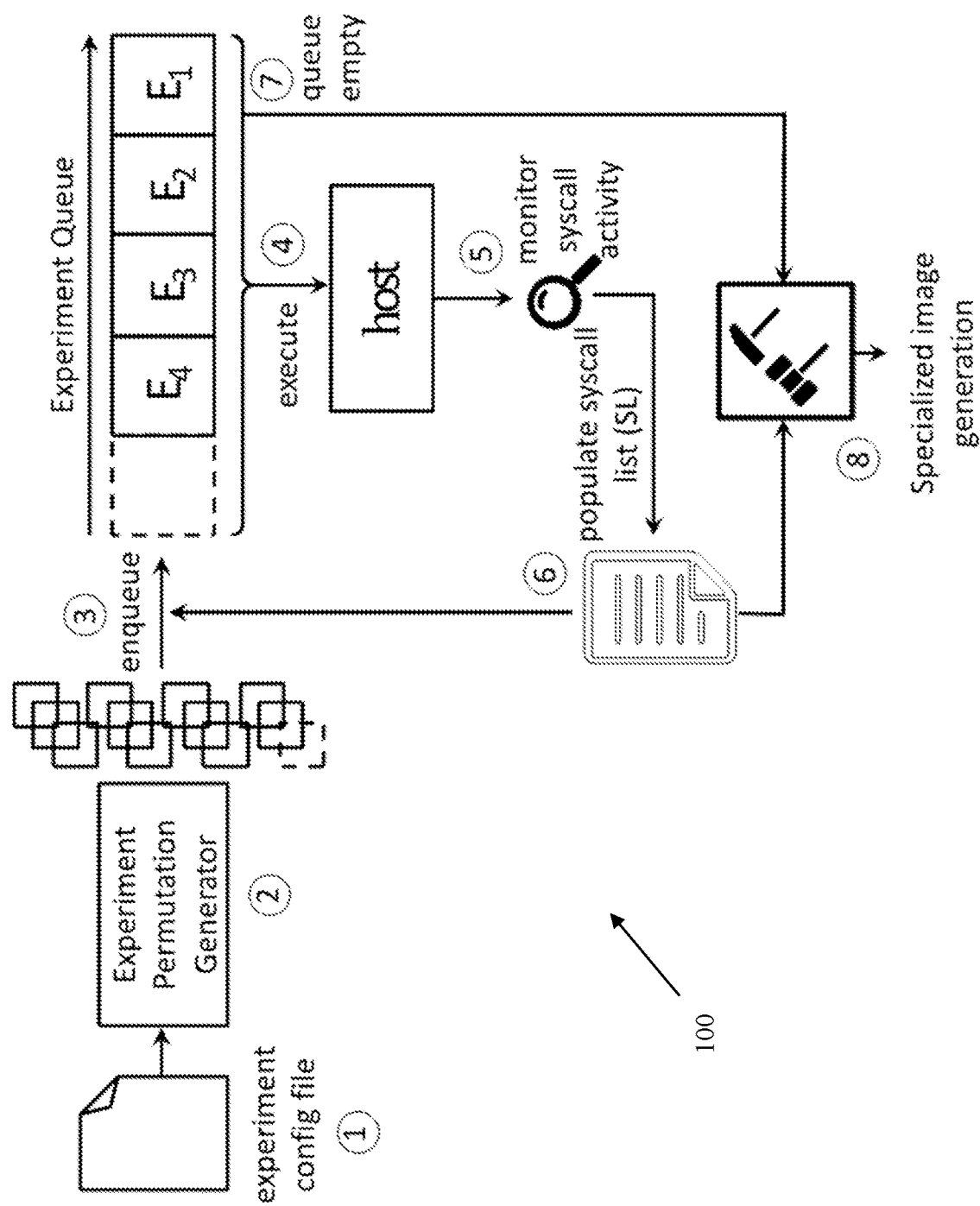
FIG. 1 schematically illustrates a method and overall system architecture according to an embodiment of the present invention.

Embodiments of the present invention advantageously enable automatically generating a secure image with a reduced or minimal set of syscalls required by an application to run.

According to an embodiment, a method is provided for automatically generating a secure image with a reduced or minimal set of system calls (syscalls) required by an application to run. The method includes the steps of receiving as input a configuration file specifying one or more image parameters to vary; generating a set of one or more unikernel images, or experiment images, each unikernel image including a specification of how to build the image and how to run the image, each unikernel image based on one of the one or more image parameters; populating a run queue with the one or more unikernel images; and iteratively: executing each of the one or more unikernel images in a host virtual machine; and monitoring, at run-time, a usage of syscalls in the executing image to identify syscalls actually used at any point in time during the executing.

According to an embodiment, the method further includes building a final image that includes only the identified syscalls actually used during the executing of each of the one or more unikernel images.

According to an embodiment, the method further includes deploying the final image. Deploying may include executing the final image on a host computer system or network.

According to an embodiment, the monitoring, at run time, the usage of syscalls includes logging and timestamping, in a list, the syscalls actually used during the executing, and wherein the building a final image that includes only the identified syscalls actually used during the executing of each of the one or more unikernel images includes building an image that includes only syscalls on the list.

According to an embodiment, the generating includes, for each of the one or more unikernel images, generating a unikernel specification identifying how to build the unikernel image and how to run the unikernel image.

According to an embodiment, the configuration file specifies how to vary some or all of the one o According to an embodiment, the method further includes r more image parameters.

According to an embodiment, the method further includes determining for each unikernel image executed an amount of code of the unikernel image that actually executed.

According to an embodiment, a system is provided that includes one or more processors which, alone or in combination, are configured to provide for execution of a method of automatically generating a secure image with a reduced or minimal set of system calls (syscalls) required by an application to run. In an embodiment, the method includes receiving as input a configuration file specifying one or more image parameters to vary; generating a set of one or more unikernel images, each unikernel image including a specification of how to build the image and how to run the image, each unikernel image based on one of the one or more image parameters; populating a run queue with the one or more unikernel images; and iteratively: executing each of the one or more unikernel images in a host virtual machine; and monitoring, at run-time, a usage of syscalls in the executing image to identify syscalls actually used at any point in time during the executing. In other embodiments, the method may include additional steps as described herein.

According to an embodiment, a tangible, non-transitory computer-readable medium is provided that has instructions stored thereon which, upon being executed by one or more processors, alone or in combination, provide for execution of a method of automatically generating a secure image with a reduced or minimal set of system calls (syscalls) required by an application to run. In an embodiment, the method includes receiving as input a configuration file specifying one or more image parameters to vary; generating a set of one or more unikernel images, each unikernel image including a specification of how to build the image and how to run the image, each unikernel image based on one of the one or more image parameters; populating a run queue with the one or more unikernel images; and iteratively: executing each of the one or more unikernel images in a host virtual machine; and monitoring, at run-time, a usage of syscalls in the executing image to identify syscalls actually used at any point in time during the executing. In other embodiments, the method may include additional steps as described herein.

System calls (syscalls) are the means that user-space applications have for interacting with an operating system's kernel. As a result, system calls represent a major vector for potential attacks. Embodiments of the present invention provide a method for sealing, at run-time, syscalls that are not needed by a particular application at a particular phase of its execution. In this way, embodiments of the present invention significantly reduce the syscall attack surfaces, and thereby enhance security of the application and the operating system, and protect the running image from a number of attacks.

One of the techniques for making deployed applications and operating systems more secure is to reduce their attack surface, i.e., the amount of running code that may be running in them, since there is a direct correlation between the amount of code and the amount of potential exploits exposed by the running code. Along these lines, syscalls are of particular interest to attackers since they represent the application programming interface (API) that the operating system kernel exposes to user-level applications, and so exploiting the system calls can potentially lead to the attacker taking control of the entire system.

Ghavamnia, S., et al., "Temporal System Call Specialization for Attack Surface Reduction," 29th USENIX Security Symposium (Aug. 12-14, 2020), hereinafter "Ghavamnia", which is hereby incorporated by reference herein, introduced temporal system call specialization, a technique that analyzes an application at compile time, identifies the syscalls it needs, and removes or filters those it does not need. In this way, the technique in Ghavamnia reduces the syscall attack surface and the potential for exploits. To do so, it defines two execution phases, an initialization (init) phase and a running phase, and filters syscalls based on which of these two phases the application is in. However, the approach suffers from three major issues:

1. The identification of the syscalls occurs at compile time and may be inaccurate (e.g., there may be syscalls present in the code that never get used, and so would be available for exploit while providing no utility to the application).
2. The approach identifies only two execution phases (init, running), and only filters syscalls once, when the application transitions from one phase to the next; while this may be sufficient for some server applications, many applications (e.g., network functions) may have extremely different syscall execution needs throughout their lifetime, perhaps even based on the traffic pattern or incoming requests.
3. The identification of the two phases has to be done manually, by having an expert look through an application's code base and manually analyzing a call graph to spot the transition from one phase to the next.

In an embodiment, the present invention provides a method for "sealing" system calls (syscalls). For example, in an embodiment, a method is provided for determining which syscalls are not needed by a running image (i.e., the operating system, libraries and application) at a point in time t and can thus be disabled in order to reduce the number of vectors of potential attack. Such method provides a diverse form of specialization, in that it not only targets spatial specialization (by eliminating code that is not needed by the target application), but also temporal specialization, by disabling currently unused syscalls.

To achieve this, a method according to an embodiment of the present invention uses an iterative approach to analyze, at run-time, which syscalls are actually in use at any given point in time. In contrast to the approach of Ghavamnia, the analysis is advantageously done dynamically, is not limited to just two phases, and does not require manual analysis of the code to find the phases.

FIG. 1 schematically illustrates a method and overall system architecture 100 according to an embodiment of the present invention. In greater detail, a method according to an embodiment of the present invention begins at step 1 by reading an experiment configuration file, which stipulates which parameters of a running image, e.g., which parameters of an operating system, libraries and/or applications, to vary. In an embodiment, the configuration file can be manually-generated, e.g., by a user running the test. In some embodiments, the experiment configuration file identifies how to vary some or all parameters of the running image. For example, the following snippet provides an example of two parameters (worker_processes and Access_log) of an image and variance parameters:

| name:   | worker_processes | # num of nginx worker processes |
|---------|------------------|----------------------------------|
| min:    | 1                | # vary from 1                    |
| max:    | 10               | # to 10                          |
| step:   | 1                | # in increments of 1             |
| name:   | Access_log       | # whether to log each web access |
| values: | on\|off          | # try both on and off            |

In this example, certain Nginx (a web server) parameters are specified so that the system may vary the worker_processes parameter from 1-10 by increments of 1 in order to try different numbers of concurrent worker processes handling requests; the other parameter enables/disables whether access logging is used. Other example parameters could be network stack parameters (e.g., https://www.nongnu.org/lwip/2_1_x/group_lwip_opts. hypertext markup language for the lwip network stack)

At step 2, the configuration file is used by an Experiment Permutation Generator module to generate a set of experiments to run. For example, each experiment may include a specification of (1) how to build a unikernel, including full configuration parameters for the build process, and (2) how to run the unikernel, including for how long. As is well known to one of skill in the art, a unikernel is a specialized, single address space virtual machine. Each experiment differs from all others in the value of at least one parameter.

At step 3, each such experiment is enqueued onto the system's run queue. Each of the queued experiments may be separately executed on a host computer (e.g., a virtual machine image executing on a kernel-based virtual machine (KVM) system) at step 4, at which point the method monitors, at regular intervals, the usage of syscalls at step 5. This monitoring could be done, for example, using the strace diagnostic tool in LINUX from the host virtual machine. At step 6, usage of various syscalls for the test(s)/experiment(s) is logged and timestamped onto a syscall list. For example, each syscall used may be added to a list and a timestamp of when it was used may be added in association with the syscall. The list may be implemented as a table or other data structure stored in memory, in an embodiment.

In an embodiment, an optional additional step could be carried out to calculate the amount of coverage a test achieved, i.e., how much of the code the test actually executed; to do this, existing tools such as gcov could be used. At step 7, the cycle (iteratively) repeats by running the next experiment until there are no more experiments in the run queue. At step 8, an image is generated that contains only those syscalls that were used by the experiments, along with information about which syscalls are used at which time intervals. It is this resulting image that is actually deployed.

Figure 2:
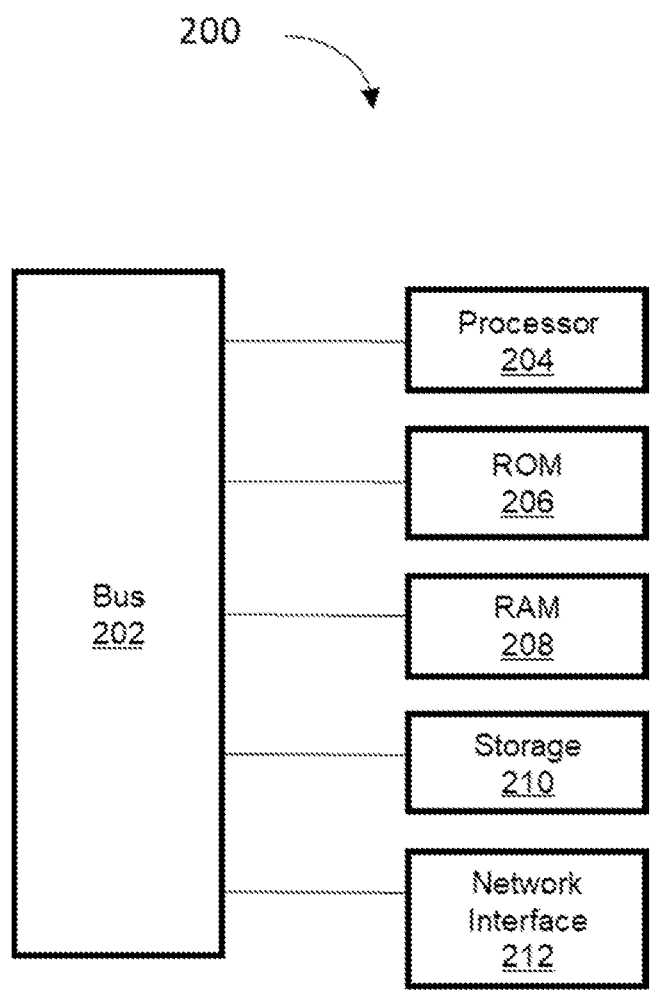
FIG. 2 is a block diagram of a processing system, according to an embodiment.

FIG. 2 is a block diagram of a processing system 200 according to an embodiment. The processing system 200 can be used to implement the protocols, devices, mechanisms, systems and methods described above and herein. For example, each functional module (e.g., Experiment Permutation Generator, host virtual machine(s), etc.) may include a processing system 200, or two or multiple modules may be implemented by a processing system 200. A processing system 200 may include one or multiple processors 204, such as a central processing unit (CPU) of a computing device or a distributed processor system. The processor(s) 204 executes processor-executable instructions for performing the functions and methods described above. In embodiments, the processor executable instructions are locally stored or remotely stored and accessed from a non-transitory computer readable medium, such as storage 210, which may be a hard drive, cloud storage, flash drive, etc. Read Only Memory (ROM) 206 includes processor-executable instructions for initializing the processor(s) 204, while the random-access memory (RAM) 208 is the main memory for loading and processing instructions executed by the processor(s) 204. The network interface 212 may connect to a wired network or cellular network and to a local area network or wide area network, such as the Internet, and may be used to receive and/or transmit data, including datasets such as instantiation requests or instructions, analytics task(s), datasets representing requested data or data streams acting as input data or output data, etc. In certain embodiments, multiple processors perform the functions of processor(s) 204.

Embodiments of the present invention provide the following advantages and improvements:

1. Providing for the construction, at run-time, of a list of system calls that are actually used by a software image in order to increase the number of syscalls that can be "sealed" and thus reduce the number of vectors of potential attack.
2. Providing a step for iteratively deducing the number of syscalls that are needed by the image by dynamically and automatically deciding which syscalls are needed at any point during the image's lifetime. This includes, in an embodiment, the use of an experiment permutation generator to provide realistic and large coverage of the application's code paths. The process may be followed by a final step in which a final compilation is used in order to generate an image containing only the syscalls arising from the analysis above.
3. Providing an additional step in which the permutation generator is configured to test a number of different parameters for the same syscall in order to see, in cases where a syscall is needed by an application, whether only certain parts of the syscall are actually needed.
4. Providing a mechanism to automatically analyze the need for particular syscalls at different points in an application's execution lifetime, removing the need for the manual work of having an expert analyze an application's code base to figure out phase transitions.
5. Providing the ability to dynamically (at run-time) analyze the use of syscalls to derive a much more accurate list of needed syscalls, without limiting the analysis to just two phases.
6. In contrast to static analysis, for example as done in Ghavamnia, providing improved accuracy and a reduced number of syscalls, and therefore a more secure deployment.

In an embodiment, the present invention provides a method for automatically generating secure images with a reduced or minimal set of syscalls required by applications to run, the method comprising the steps of:

1. An experiment permutation generator takes as input a configuration file containing parameters to vary and outputs a specification of how to build the resulting images and how to run them (i.e., experiments).
2. A run queue and system is used to run the actual experiments.
3. A mechanism is used to monitor, at run-time, the usage of syscalls.
4. A mechanism logs and timestamps, onto a list, which syscalls are used at any point in time.
5. A mechanism builds images that do not include syscalls that are not on the list.

Embodiments of the present invention thus advantageously reduce syscall attack surfaces, and advantageously does so without removing any code from the operating system or applications. Debloating and other specialization techniques can also be used in a complementary manner with embodiments of the present invention.

Embodiments of the present invention can be used to increase the security of any computer system which utilizes system calls, including major operating systems such as LINUX, FREEBSD and others, and to enhance the security of existing software.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the present invention. In particular, the present invention covers further embodiments with any combination of features from different embodiments. Additionally, statements made herein characterizing the invention refer to an embodiment of the invention and not necessarily all embodiments.

What is claimed is:

1. A method of automatically generating a secure image with a reduced or minimal set of system calls (syscalls) required by an application to run, the method comprising the steps of:

receiving as input a configuration file specifying one or more image parameters to vary;
generating a plurality of unikernel images, each unikernel image including a specification of how to build the image and how to run the image, each unikernel image based on one of the one or more image parameters;
populating a run queue with the plurality of unikernel images; and
iteratively:
executing each of the plurality of unikernel images in a host virtual machine; and
monitoring, at run-time, a usage of syscalls in the executing image to identify syscalls actually used at any point in time during the executing, wherein monitoring the usage of syscalls comprises: for each execution of a unikernel image from the plurality of unikernel images, populating a syscall list by logging one or more syscalls that are used during the execution of the unikernal image.

2. The method of claim 1, further including building a final image that includes only the identified syscalls actually used during the executing of each of the plurality of unikernel images.

3. The method of claim 2, further including deploying the final image.

4. The method of claim 2, wherein the populating the syscall list includes logging and timestamping, in the syscall list, the one or more syscalls that are actually used during the executing, and wherein the building the final image that includes only the identified syscalls actually used during the executing of each of the plurality of unikernel images includes building an image that includes only the one or more syscalls on the syscall list.

5. The method of claim 1, wherein the generating includes, for each of the plurality of unikernel images, generating a unikernel specification identifying how to build the unikernel image and how to run the unikernel image.

6. The method of claim 1, wherein the configuration file specifies how to vary some or all of the one or more image parameters.

7. The method of claim 1, further including determining for each unikernel image executed an amount of code of the unikernel image that actually executed.

8. The method of claim 1, wherein populating the syscall list by logging the one or more syscalls that are used during the execution of the unikernal image comprises logging each of the one or more syscalls that are used during the execution of the unikernal image with an associated timestamp of when a syscall, from the one or more syscalls, was used.

9. The method of claim 1, further comprising:
determining that all of the plurality of unikernal images have been executed; and
based on determining that all of the plurality of unikernal images have been executed, generating a specialized image based on the populated syscall list, wherein the specialized image indicates a plurality of syscalls that were used during the execution of the plurality of unikernal images.

10. The method of claim 9, further comprising:
disabling at least one syscall based on the specialized image and the plurality of syscalls that were used during the execution of the plurality of unikernal images.

11. A system comprising one or more processors which, alone or in combination, are configured to provide for execution of a method of automatically generating a secure image with a reduced or minimal set of system calls (syscalls) required by an application to run, the method comprising:
receiving as input a configuration file specifying one or more image parameters to vary;
generating a plurality of unikernel images, each unikernel image including a specification of how to build the image and how to run the image, each unikernel image based on one of the one or more image parameters;
populating a run queue with the plurality of unikernel images; and
iteratively:
executing each of the plurality of unikernel images in a host virtual machine; and
monitoring, at run-time, a usage of syscalls in the executing image to identify syscalls actually used at any point in time during the executing, wherein monitoring the usage of syscalls comprises: for each execution of a unikernel image from the plurality of unikernel images, populating a syscall list by logging one or more syscalls that are used during the execution of the unikernal image.

12. The system of claim 11, wherein the method further includes building a final image that includes only the identified syscalls actually used during the executing of each of the plurality of unikernel images.

13. The system of claim 12, wherein the method further includes deploying the final image.

14. The system of claim 12, wherein the populating the syscall list includes logging and timestamping, in the syscall list, the one or more syscalls that are actually used during the executing, and wherein the building the final image that includes only the identified syscalls actually used during the executing of each of the plurality of unikernel images includes building an image that includes only the one or more syscalls on the syscall list.

15. The system of claim 11, wherein the generating includes, for each of the plurality of unikernel images, generating a unikernel specification identifying how to build the unikernel image and how to run the unikernel image.

16. The system of claim 11, wherein the configuration file specifies how to vary some or all of the one or more image parameters.

17. The system of claim 11, wherein the method further includes determining for each unikernel image executed an amount of code of the unikernel image that actually executed.

18. A tangible, non-transitory computer-readable medium having instructions thereon which, upon being executed by one or more processors, alone or in combination, provide for execution of a method of automatically generating a secure image with a reduced or minimal set of system calls (syscalls) required by an application to run, the method comprising:
receiving as input a configuration file specifying one or more image parameters to vary;
generating a plurality of unikernel images, each unikernel image including a specification of how to build the image and how to run the image, each unikernel image based on one of the one or more image parameters;
populating a run queue with the plurality of unikernel images; and
iteratively:
executing each of the plurality of unikernel images in a host virtual machine; and
monitoring, at run-time, a usage of syscalls in the executing image to identify syscalls actually used at any point in time during the executing, wherein monitoring the usage of syscalls comprises: for each execution of a unikernel image from the plurality of unikernel images, populating a syscall list by logging one or more syscalls that are used during the execution of the unikernal image.

\* \* \* \* \*